US011177477B2

United States Patent
Kang et al.

(10) Patent No.: US 11,177,477 B2
(45) Date of Patent: Nov. 16, 2021

(54) NEGATIVE ELECTRODE PLATE AND BATTERY

(71) Applicant: CONTEMPORARY AMPEREX TECHNOLOGY CO., LIMITED, Ningde (CN)

(72) Inventors: Meng Kang, Ningde (CN); Tianquan Peng, Ningde (CN); Yuliang Shen, Ningde (CN); Libing He, Ningde (CN)

(73) Assignee: CON TEMPORARY AMPEREX TECHNOLOGY CO., LIMITED, Ningde (CN)

( * ) Notice: Subject to any disclaimer, the term of this patent is extended or adjusted under 35 U.S.C. 154(b) by 185 days.

(21) Appl. No.: 16/389,760

(22) Filed: Apr. 19, 2019

(65) Prior Publication Data
US 2019/0334172 A1   Oct. 31, 2019

(30) Foreign Application Priority Data
Apr. 28, 2018   (CN) .......................... 201810398055.0

(51) Int. Cl.
| *H01M 4/587* | (2010.01) |
| *H01M 4/133* | (2010.01) |
| *H01M 10/0525* | (2010.01) |
| *H01M 4/02* | (2006.01) |

(52) U.S. Cl.
CPC ........... *H01M 4/587* (2013.01); *H01M 4/133* (2013.01); *H01M 2004/021* (2013.01); *H01M 2004/027* (2013.01)

(58) Field of Classification Search
CPC .............................. H01M 4/587; H01M 4/133
See application file for complete search history.

(56) References Cited

U.S. PATENT DOCUMENTS

2014/0227588 A1* 8/2014 Kim ..................... H01M 4/625
429/188

FOREIGN PATENT DOCUMENTS

| CN | 103053054 A | 4/2013 |
| CN | 103199251 A | 7/2013 |
| CN | 103259046 B | 5/2016 |
| CN | 106299236 A | 1/2017 |
| CN | 106477569 A | 3/2017 |
| EP | 2790252 A1 | 10/2014 |
| JP | 2013004307 A | 1/2013 |
| JP | 2014192064 A | 10/2014 |
| JP | 2017188334 A | 10/2017 |

OTHER PUBLICATIONS

Hang et al. CN 103199251. Jul. 10, 2013. English machine translation. (Year: 2013).*
Contemporary Amperex Technology Co., Limited, First Office action, CN201810398055.0, dated Jan. 11, 2019, 8 pgs.
Contemporary Amperex Technology Co., Limited, Extended European Search Report, EP19170783.5, dated Jul. 17, 2019, 7 pgs.

* cited by examiner

*Primary Examiner* — James Lee
(74) *Attorney, Agent, or Firm* — Morgan, Lewis & Bockius LLP

(57) ABSTRACT

The present disclosure provides a negative electrode plate and a battery, the negative electrode plate comprises a negative current collector and a negative film, the negative film is provided on at least one surface of the negative current collector and comprises a negative active material. The negative active material comprises graphite, and an OI value of the negative film represented by $V_{OI}$ and a pressing density of the negative film represented by PD satisfy a relationship: $0.7 \leq (80/V_{OI}+43/PD) \times PD/V_{OI} \leq 21.5$, where a unit of the pressing density of the negative film represented by PD is $g/cm^3$. The battery of the present disclosure can have the characteristics of fast charging speed, high energy density, good safety performance and long cycle life at the same time.

12 Claims, No Drawings

NEGATIVE ELECTRODE PLATE AND BATTERY

CROSS-REFERENCE TO RELATED APPLICATIONS

The present application claims priority to Chinese patent application No. CN201810398055.0, filed on Apr. 28, 2018, which is incorporated herein by reference in its entirety.

FIELD OF THE PRESENT DISCLOSURE

The present disclosure relates to the field of battery, and particularly relates to a negative electrode plate and a battery.

BACKGROUND OF THE PRESENT DISCLOSURE

Charging speed is one of key technologies that must be resolved when using new energy automotives to replace traditional oil-fueled automotives, and the charging speed is also an important factor that affects experience of users, therefore power battery companies have successively invested a great deal of human resources and material resources. In a particular power battery system, the negative electrode plate is the key factor that determines the charging speed of the power battery.

At present, most researches focus on the design of the negative active material, and very few researches focus on the design of the negative electrode plate. And lots of researches have shown that if the negative active material having excellent rate performance is used in an unreasonably designed negative electrode plate, the goal of continuous fast charging is not necessarily attained; and if the negative active material having general rate performance is used in a reasonably designed negative electrode plate, the goal of fast charging may be attained. Therefore, the selection of the negative active material and the design of the negative electrode plate are the key factors to obtain a battery having a fast charging speed.

SUMMARY OF THE PRESENT DISCLOSURE

In view of the problem existing in the background, an object of the present disclosure is to provide a negative electrode plate and a battery, which has the characteristics of fast charging speed, high energy density, good safety performance and long cycle life at the same time.

In order to achieve the above object, in a first aspect of the present disclosure, the present disclosure provides a negative electrode plate, which comprises a negative current collector and a negative film, the negative film is provided on at least one surface of the negative current collector and comprises a negative active material. The negative active material comprises graphite, and an OI value of the negative film represented by $V_{OI}$ and a pressing density of the negative film represented by PD satisfy a relationship: $0.7 \leq (80/V_{OI}+43/PD) \times PD/V_{OI} \leq 21.5$, and a unit of the pressing density of the negative film represented by PD is $g/cm^3$.

In a second aspect of the present disclosure, the present disclosure provides a battery, which comprises the negative electrode plate according to the first aspect of the present disclosure.

Compared with the existing technologies, the present disclosure at least includes following beneficial effects: the negative active material of the present disclosure comprises graphite, and by matching the relationship between the OI value of the negative film and the pressing density of the negative film can make the negative electrode plate have more effective end faces capable of deintercalating and intercalating the active ions, and it is beneficial for the fast deintercalation and the fast intercalation of the active ions, thereby ensuring that the battery has good safety performance and fast charging speed, and also ensuring that the battery has long cycle life and high energy density while being charged under a large rate and a fast speed.

DETAILED DESCRIPTION

Hereinafter a negative electrode plate and a battery according to the present disclosure are described in detail.

Firstly, a negative electrode plate according to a first aspect of the present disclosure is described. The negative electrode plate comprises a negative current collector and a negative film, the negative film is provided on at least one surface of the negative current collector and comprises a negative active material. The negative active material comprises graphite, and an OI value of the negative film represented by $V_{OI}$ and a pressing density of the negative film represented by PD satisfy a relationship: $0.7 \leq (80/V_{OI}+43/PD) \times PD/V_{OI} \leq 21.5$, and a unit of the pressing density of the negative film represented by PD is $g/cm^3$.

Generally, the negative electrode plate needs to undergo the following three electrochemical processes during the charging process of the battery: (1) the active ions (such as lithium ions, sodium-ions and the like) deintercalate from the positive active material and enter into the electrolyte, and then enter into the porous structure of the negative film along with the electrolyte, so that a liquid phase conduction process of the active ions in the porous structure of the negative film is completed, and the liquid phase conduction process comprises a liquid phase diffusion process and an electromigration process; (2) the active ions exchange charges with the electrons on the surface of the negative active material; (3) the active ions enter into the crystal structure of the negative active material from the surface of the negative active material through a solid phase conduction process.

If the pressing density of the negative film is too large, the negative active material particles forcedly tend to be distributed parallel to the negative current collector, the end faces capable of deintercalating and intercalating the active ions in the negative active material particles partially will not play the function thereof, the effective end faces capable of deintercalating and intercalating the active ions in the negative electrode plate are decreased and also the OI value of the negative film are larger, thereby decreasing the dynamics performance of the battery. If the pressing density of the negative film is too small, the negative active material particles tend to be randomly distributed, although the negative electrode plate has more effective end faces capable of deintercalating and intercalating the active ions and also the OI value of the negative film is smaller, the electronic conductivity of the negative electrode plate will be affected, the negative electrode plate has the risk of exfoliation of the negative film and wrinkling, thereby affecting the improvement on the charging speed of the battery.

Therefore the pressing density of the negative film and the OI value of the negative film have a significant effect on the charging speed of the battery. The OI value of the negative film represented by $V_{OI}$ and the pressing density of the negative film represented by PD are considered together when designing the negative electrode plate of the present disclosure, and when the OI value of the negative film represented by $V_{OI}$ and the pressing density of the negative film represented by PD satisfy a relationship $0.7 \leq (80/V_{OI}+43/PD) \times PD/V_{OI} \leq 21.5$, the battery having the characteristics of fast charging speed, high energy density, good safety performance and long cycle life at the same time may be obtained.

Preferably, the OI value of the negative film represented by $V_{OI}$ and the pressing density of the negative film represented by PD satisfy a relationship: $1.8 \leq (80/V_{OI}+43/PD) \times PD/V_{OI} \leq 16$.

The inventors also found that, when a particle diameter of the negative active material represented by D50 is too large, the end faces capable of deintercalating and intercalating the active ions are too less with respect to the negative active material particle having same mass, and the solid phase diffusion resistance of the active ions inside the negative active material particle is larger, therefore the charging speed of the battery cannot be effectively improved; when the particle diameter of the negative active material represented by D50 is too small, the negative slurry is difficult to disperse, the bonding force between the negative active material particle and the negative current collector and the bonding force between the negative active material particles in the prepared negative electrode plate are both worse, thereby affecting the consistency of the battery. At the same time, when an OI value of a powder of the negative active material is too large, the end faces capable of deintercalating and intercalating the active ions in the negative active material particle itself are less, therefore the charging speed of the battery cannot be effectively improved; when the OI value of the powder of the negative active material is too small, the negative active material particles tend to be isotropically distributed, the negative electrode plate is easily wrinkled and exfoliation of the negative film easily occurs during the cycle process of the battery, thereby affecting the cycle life of the battery.

The inventors further found that, by reasonably selecting the negative active material and making the particle diameter of the negative active material represented by D50 (with a unit of μm) and the OI value of the powder of the negative active material represented by $G_{OI}$ satisfy a relationship $2.8 \leq 100/(D50+2.8 \times G_{OI}) \leq 12$, the charging speed, the energy density, the safety performance and the cycle life of the battery are further improved.

Preferably, the particle diameter of the negative active material represented by D50 and the OI value of the powder of the negative active material represented by $G_{OI}$ satisfy a relationship: $4 \leq 100/(D50+2.8 \times G_{OI}) \leq 8.5$.

When reasonably designing the parameters of the negative electrode plate and taking the effect of the used negative active material in the negative film on the performance of the battery into account so as to make them comprehensively considered and reasonably matched during the design of the battery, the performance of the battery may be further improved.

The inventors more further found that, when the negative active material and the negative electrode plate satisfy a relationship $2.8 \leq (X \times 0.8 + Y \times 0.2) \times Y/X \leq 15$, the performance of the battery is more further improved, where $X=(80/V_{OI}+43/PD) \times PD/V_{OI}$, $Y=100/(D50+2.8 \times G_{OI})$. Preferably, the negative active material and the negative electrode plate satisfy a relationship $3.5 \leq (X \times 0.8 + Y \times 0.2) \times Y/X \leq 12.5$.

In the negative electrode plate according to the first aspect of the present disclosure, preferably, the pressing density of the negative film represented by PD is $0.8 \text{ g/cm}^3 \sim 2.0 \text{ g/cm}^3$. Further preferably, the pressing density of the negative film represented by PD is $1.0 \text{ g/cm}^3 \sim 1.6 \text{ g/cm}^3$.

In the negative electrode plate according to the first aspect of the present disclosure, preferably, the OI value of the negative film represented by $V_{OI}$ is 2~60. Further preferably, the OI value of the negative film represented by $V_{OI}$ is 3~32.

In the negative electrode plate according to the first aspect of the present disclosure, preferably, the particle diameter of the negative active material represented by D50 is 1 μm~20 μm. Further preferably, the particle diameter of the negative active material represented by D50 is 4 μm~15 μm.

In the negative electrode plate according to the first aspect of the present disclosure, preferably, the OI value of the powder of the negative active material represented by $G_{OI}$ is 0.5~7. Further preferably, the OI value of the powder of the negative active material represented by $G_{OI}$ is 2~4.5.

In the negative electrode plate according to the first aspect of the present disclosure, the negative film may be provided on one of the surfaces of the negative current collector, and the negative film may also be provided on both surfaces of the negative current collector.

In the negative electrode plate according to the first aspect of the present disclosure, the graphite may be one or more selected from a group consisting of artificial graphite and natural graphite.

In the negative electrode plate according to the first aspect of the present disclosure, the negative active material may further comprise one or more selected from a group consisting of soft carbon, hard carbon, carbon fiber, mesocarbon microbeads, silicon-based material, tin-based material and lithium titanate besides the graphite. Preferably, the silicon-based material may be elemental silicon, silicon oxide, silicon carbon composite and silicon alloy; the tin-based material may be elemental tin, tin oxide compound and tin alloy.

In the negative electrode plate according to the first aspect of the present disclosure, the negative film further comprises a conductive agent and a binder, the types and the contents of the conductive agent and the binder are not specifically limited and may be selected based on actual demands.

In the negative electrode plate according to the first aspect of the present disclosure, the type of the negative current collector is not specifically limited and may be selected based on actual demands, and preferably, the negative current collector is a copper foil.

In the negative electrode plate according to the first aspect of the present disclosure, the particle diameter of the negative active material represented by D50 may be obtained by a laser diffraction particle size analyzer (Mastersizer 3000), a particle size distribution is obtained according to the particle size analysis-laser diffraction method (specifically referring to GB/T19077-2016), and the average particle diameter is represented by the median value D50 of the volume particle size distribution.

The OI value of the powder of the negative active material and the OI value of the negative film may be obtained by a X-ray powder diffractometer (X'pert PRO), a X-ray diffraction pattern is obtained according to the general rules for X-ray diffractometric analysis JIS K 0131-1996 and the determination method of artificial graphite lattice parameter JB/T4220-2011, the OI value=$C_{004}/C_{110}$, $C_{004}$ represents characteristic diffraction peak area of (004) crystal plane, $C_{110}$ represents characteristic diffraction peak area of (110) crystal plane.

The pressing density of the negative film is obtained according to an equation PD=m/V, where m represents the weight of the negative film, V represents the volume of the negative film. m may be obtained by an electronic balance with an accuracy of 0.01 g or more; the volume of the negative film represented by V is a product of the surface area of the negative film and the thickness of the negative film, and the thickness of the negative film may be obtained by a spiral micrometer with an accuracy of 0.5 μm.

In the negative electrode plate according to the first aspect of the present disclosure, a preparation method of the negative electrode plate may comprise steps of: (1) mixing: a negative active material, a conductive agent and a binder with a certain ratio are uniformly dissolved in a solvent to obtain a slurry; (2) coating: the slurry is uniformly coated on a negative current collector, which is then sufficiently dried to remove the solvent by an oven; (3) cold pressing: the dried negative electrode plate is then cold pressed under a certain pressure and a certain roll gap; (4) cutting: the cold pressed negative electrode plate is slit and plate cut to a specified size for use.

In the above preparation method of the negative electrode plate, the particle size of the negative active material represented by D50 and the OI value of the powder of the negative active material represented by $G_{OI}$ both affect the OI value of the negative film represented by $V_{OI}$ to an extent, therefore the desired $V_{OI}$ may be obtained by changing the value of D50 and the value of $G_{OI}$; the OI value of the negative film represented by $V_{OI}$ may also be changed by using magnetic field inducing technique during the coating process of the slurry so as to artificially induce the arrangement of the negative active materials in the negative electrode plate; the OI value of the negative film represented by $V_{OI}$ may also be changed by adjusting the pressing density of the negative film during the cold pressing process so as to change the arrangement of the negative active materials in the negative electrode plate.

Next a battery according to a second aspect of the present disclosure is described, the battery comprises the negative electrode plate according to the first aspect of the present disclosure, a positive electrode plate, a separator and an electrolyte.

It should be noted that, the battery according to the second aspect of the present disclosure may be a lithium-ion battery, a sodium-ion battery and any other battery using the negative electrode plate according to the first aspect of the present disclosure.

Specifically, when the battery is the lithium-ion battery, the positive electrode plate comprises a positive current collector and a positive film, the positive film is provided on a surface of the positive current collector and comprises a positive active material, the positive active material may be selected from lithium cobalt oxide, lithium nickel oxide, lithium manganese oxide, lithium nickel manganese oxide, lithium nickel cobalt manganese oxide, lithium nickel cobalt aluminum oxide and olivine-type lithium-containing phosphate, but the present disclosure is not limited to these materials, other conventionally known materials that can be used as the positive active material of the lithium-ion battery can also be used. These positive active materials may be used alone or may be used two or more of them in combination. Preferably, the positive active material may be one or more selected from a group consisting of $LiCoO_2$, $LiNiO_2$, $LiMnO_2$, $LiMn_2O_4$, $LiNi_{1/3}Co_{1/3}Mn_{1/3}O_2$ (NCM333), $LiNi_{0.5}Co_{0.2}Mn_{0.3}O_2$ (NCM523), $LiNi_{0.6}Co_{0.2}Mn_{0.2}O_2$ (NCM622), $LiNi_{0.8}Co_{0.1}Mn_{0.1}O_2$ (NCM811), $LiNi_{0.85}Co_{0.15}Al_{0.05}O_2$, $LiFePO_4$ and $LiMnPO_4$.

Specifically, when the battery is the sodium-ion battery, the positive electrode plate comprises a positive current collector and a positive film, the positive film is provided on a surface of the positive current collector and comprises a positive active material, the positive active material may be selected from transition metal oxide $Na_xMO_2$ (M represents transition metal, preferably, M is one or more selected from a group consisting of Mn, Fe, Ni, Co, V, Cu and Cr, $0<x\leq1$), polyanion-type material (phosphate-type, fluorophosphate-type, pyrophosphate-type and sulfate-type) and prussian blue material, but the present disclosure is not limited to these materials, other conventionally known materials that can be used as the positive active material of the sodium-ion battery can also be used. These positive active materials may be used alone or may be used two or more of them in combination. Preferably, the positive active material may be one or more selected from a group consisting of $NaFeO_2$, $NaCoO_2$, $NaCrO_2$, $NaMnO_2$, $NaNiO_2$, $NaNi_{1/2}Ti_{1/2}O_2$, $NaNi_{1/2}Mn_{1/2}O_2$, $Na_{2/3}Fe_{1/3}Mn_{2/3}O_2$, $NaNi_{1/3}Co_{1/3}Mn_{1/3}O_2$, $NaFePO_4$, $NaMnPO_4$, $NaCoPO_4$, prussian blue material and a material with a general formula of $A_aM_b(PO_4)_cO_xY_{3-x}$ (A is one or more selected from a group consisting of $H^-$, $Li^+$, $Na^+$, $K^+$ and $NH_4^+$; M represents transition metal cation, preferably, M is one or more selected from a group consisting of V, Ti, Mn, Fe, Co, Ni, Cu and Zn; Y represents anion of halogen, preferably, Y is one or more selected from a group consisting of F, Cl and Br; $0<a\leq4$, $0<b\leq2$, $1\leq c\leq3$, $0\leq x\leq2$).

In the battery according to the second aspect of the present disclosure, the specific type and the specific composition of the separator and the electrolyte are not specifically limited and may be selected based on actual demands.

Hereinafter the present disclosure will be described in detail in combination with examples. It should be noted that, the examples described in the present disclosure are only used for explaining the present disclosure, and are not intended to limit the present disclosure.

Batteries of examples 1-36 and comparative examples 1-4 were all prepared in accordance with the following preparation method.

(1) Preparation of a Positive Electrode Plate

NCM523 (positive active material), acetylene black (conductive agent) and PVDF (binder) according to a mass ratio of 96:2:2 were uniformly mixed with NMP (solvent), which then became homogeneous under stirring via a vacuum mixer, a positive slurry was obtained; then the positive slurry was uniformly coated on aluminum foil (positive current collector), drying was then performed under room temperature and continual drying was performed in an oven, which was then followed by cold pressing, slitting and plate cutting, finally the positive electrode plate was obtained.

(2) Preparation of a Negative Electrode Plate

Graphite or a mixer of graphite and other active materials with a certain mass ratio (negative active material), acetylene black (conductive agent), CMC (thickening agent) and SBR (binder) according to a mass ratio of 96.4:1:1.2:1.4 were uniformly mixed with deionized water (solvent), which then became homogeneous under stirring via a vacuum mixer, a negative slurry was obtained; then the negative slurry was uniformly coated on copper foil (negative current collector), drying was then performed under room temperature and continual drying was performed in an oven, which was then followed by cold pressing, slitting and plate cutting, finally the negative electrode plate was obtained.

(3) Preparation of an Electrolyte

Ethylene carbonate (EC), ethyl methyl carbonate (EMC) and diethyl carbonate (DEC) according to a volume ratio of 1:1:1 were mixed together to obtain an organic solvent, then sufficiently dried $LiPF_6$ (lithium salt) was dissolved into the mixed organic solvent to obtain an electrolyte, and a concentration of the electrolyte was 1 mol/L.

(4) Preparation of a Separator

The separator was a polyethylene membrane.

(5) Preparation of a Lithium-Ion Battery

The positive electrode plate, the separator and the negative electrode plate were laminated in order, the separator was positioned between the positive electrode plate and the negative electrode plate so as to separate the positive electrode plate from the negative electrode plate, then the positive electrode plate, the separator and the negative electrode plate were wound together to form an electrode assembly, then the electrode assembly was put into a case, which was followed by baking, electrolyte injection, vacuum packaging, standby, formation, shaping and the like, finally a lithium-ion battery was obtained.

Hereinafter test processes of the lithium-ion batteries were described.

(1) Testing of the Dynamics Performance:

At 25° C., the lithium-ion batteries prepared in the examples and the comparative examples were fully charged at a constant current of 4 C and fully discharged at a constant current of 1 C for 10 cycles, then the lithium-ion batteries were fully charged at a constant current of 4 C, then the negative electrode plates were disassembled from the lithium-ion batteries, and the lithium precipitation on the surface of each negative electrode plate was observed. The lithium-precipitation area of less than 5% was considered to be slight lithium precipitation, the lithium-precipitation area of 5% to 40% was considered to be moderate lithium precipitation, and the lithium-precipitation area of more than 40% was considered to be serious lithium precipitation.

(2) Testing of the Cycle Performance:

At 25° C., the lithium-ion batteries prepared in the examples and the comparative examples were charged at a constant current of 3 C and discharged at a constant current of 1 C, the fully charging/discharging cycle process was repeated until the capacity of the lithium-ion battery decayed to 80% of the initial capacity, and the cycle number of the lithium-ion battery was recorded.

TABLE 1

Parameters and test results of examples 1-36 and comparative examples 1-4

| | Negative active material | | | Negative electrode plate | | | | | | |
|---|---|---|---|---|---|---|---|---|---|---|
| | Type | D50 (μm) | OI value of powder | PD (g/cm$^3$) | OI value of film | X | Y | (X × 0.8 + Y × 0.2) × Y/X | Dynamics performance | Cycle number |
| Example 1 | graphite | 15 | 3.1 | 1.2 | 64 | 0.70 | 4.22 | 8.51 | slight lithium precipitation | 2100 |
| Example 2 | graphite | 15 | 3.1 | 1.5 | 60 | 0.75 | 4.22 | 8.13 | slight lithium precipitation | 2430 |
| Example 3 | graphite | 15 | 3.1 | 1.2 | 28 | 1.66 | 4.22 | 5.53 | slight lithium precipitation | 2400 |
| Example 4 | graphite | 15 | 3.1 | 1.5 | 26 | 1.83 | 4.22 | 5.33 | no lithium precipitation | 4850 |
| Example 5 | graphite | 15 | 3.1 | 1.9 | 20 | 2.53 | 4.22 | 4.79 | no lithium precipitation | 4370 |
| Example 6 | graphite | 15 | 3.1 | 1.3 | 10 | 5.34 | 4.22 | 4.05 | no lithium precipitation | 4370 |
| Example 7 | graphite | 15 | 3.1 | 1.1 | 5 | 12.12 | 4.22 | 3.67 | no lithium precipitation | 2430 |
| Example 8 | graphite | 15 | 3.1 | 1 | 4 | 15.75 | 4.22 | 3.60 | no lithium precipitation | 4300 |
| Example 9 | graphite | 15 | 3.1 | 1.1 | 4 | 16.25 | 4.22 | 3.60 | slight lithium precipitation | 2400 |
| Example 10 | graphite | 15 | 3.1 | 0.8 | 3 | 21.44 | 4.22 | 3.54 | slight lithium precipitation | 1800 |
| Example 11 | graphite | 4 | 1.6 | 1 | 10 | 5.10 | 11.79 | 14.89 | slight lithium precipitation | 2750 |
| Example 12 | graphite | 7 | 1.6 | 1 | 15 | 3.22 | 8.71 | 11.68 | slight lithium precipitation | 2600 |
| Example 13 | graphite | 4 | 2.8 | 1.1 | 15 | 3.26 | 8.45 | 11.14 | no lithium precipitation | 4300 |
| Example 14 | graphite | 7 | 2 | 1 | 20 | 2.35 | 7.94 | 11.71 | no lithium precipitation | 4600 |
| Example 15 | graphite | 12 | 1.8 | 1.5 | 25 | 1.91 | 5.87 | 8.30 | no lithium precipitation | 4850 |
| Example 16 | graphite | 15 | 2 | 1.5 | 20 | 2.45 | 4.85 | 5.81 | no lithium precipitation | 4370 |
| Example 17 | graphite | 18 | 2.5 | 1.3 | 6 | 10.06 | 4.00 | 3.52 | no lithium precipitation | 4230 |
| Example 18 | graphite | 19 | 2.8 | 1.5 | 17 | 2.94 | 3.73 | 3.92 | slight lithium precipitation | 2430 |
| Example 19 | graphite | 15 | 6 | 1.1 | 12 | 4.19 | 3.14 | 2.99 | slight lithium precipitation | 2400 |
| Example 20 | graphite | 0.8 | 1.9 | 1 | 15 | 3.22 | 16.34 | 29.64 | moderate lithium precipitation | 1210 |
| Example 21 | graphite | 2.5 | 0.4 | 1 | 15 | 3.22 | 27.62 | 69.46 | moderate lithium precipitation | 1310 |
| Example 22 | graphite | 2.5 | 1.9 | 1 | 15 | 3.22 | 12.79 | 20.38 | moderate lithium precipitation | 1320 |
| Example 23 | graphite | 25 | 4 | 1.1 | 11 | 4.64 | 2.76 | 2.54 | moderate lithium precipitation | 1350 |

TABLE 1-continued

Parameters and test results of examples 1-36 and comparative examples 1-4

| | Negative active material | | | Negative electrode plate | | | | | | |
|---|---|---|---|---|---|---|---|---|---|---|
| | Type | D50 (μm) | OI value of powder | PD (g/cm³) | OI value of film | X | Y | (X × 0.8 + Y × 0.2) × Y/X | Dynamics performance | Cycle number |
| Example 24 | graphite | 18 | 8 | 1.1 | 11 | 4.64 | 2.48 | 2.24 | moderate lithium precipitation | 1370 |
| Example 25 | graphite | 20 | 6.5 | 1.1 | 11 | 4.64 | 2.62 | 2.39 | moderate lithium precipitation | 1130 |
| Example 26 | graphite | 18 | 2.5 | 1 | 4 | 15.75 | 4.00 | 3.40 | slight lithium precipitation | 2650 |
| Example 27 | graphite | 15 | 3.1 | 1 | 5 | 11.80 | 4.22 | 3.68 | no lithium precipitation | 4370 |
| Example 28 | graphite | 15 | 2.5 | 1.9 | 20 | 2.53 | 4.55 | 5.27 | no lithium precipitation | 4370 |
| Example 29 | graphite | 10 | 2.2 | 1.6 | 20 | 2.47 | 6.19 | 8.05 | no lithium precipitation | 4370 |
| Example 30 | graphite | 6 | 3.2 | 1.4 | 35 | 1.32 | 6.68 | 12.12 | no lithium precipitation | 2430 |
| Example 31 | graphite | 5 | 2.8 | 1.5 | 25 | 1.91 | 7.79 | 12.58 | no lithium precipitation | 2430 |
| Example 32 | graphite | 4 | 2.8 | 0.9 | 25 | 1.84 | 8.45 | 14.53 | slight lithium precipitation | 2650 |
| Example 33 | graphite | 3.5 | 3 | 1.5 | 30 | 1.57 | 8.40 | 15.74 | moderate lithium precipitation | 1550 |
| Example 34 | graphite + soft carbon (7:3) | 8.2 | 3.1 | 1.3 | 20 | 2.41 | 5.92 | 7.65 | no lithium precipitation | 5500 |
| Example 35 | graphite + hard carbon (7:3) | 7.8 | 3.2 | 1.3 | 9.5 | 5.68 | 5.97 | 6.03 | no lithium precipitation | 5100 |
| Example 36 | graphite + lithium titanate (7:3) | 8 | 2.9 | 1.5 | 15 | 3.40 | 6.20 | 7.23 | no lithium precipitation | 6300 |
| Comparative example 1 | graphite | 15 | 3.1 | 1.0 | 64 | 0.69 | 4.22 | 8.54 | serious lithium precipitation | 480 |
| Comparative example 2 | graphite | 15 | 3.1 | 1.0 | 3 | 23.22 | 4.22 | 3.53 | serious lithium precipitation | 550 |
| Comparative example 3 | graphite | 18 | 4 | 1.2 | 1.8 | 53.52 | 3.42 | 2.78 | serious lithium precipitation | 470 |
| Comparative example 4 | graphite | 18 | 3.5 | 0.8 | 2 | 37.50 | 3.60 | 2.95 | serious lithium precipitation | 490 |

Examples 1-10 illustrated test results with the particle diameter of the negative active material represented by D50 being 15 μm and the OI value of the powder of the negative active material being 3.1, the effects of different negative electrode plates on the performance of the battery were observed while the negative active material was the same. When the relationship between the pressing density of the negative film and the OI value of the negative film were adjusted and matched to make the value of $(80/V_{OI}+43/PD) \times PD/V_{OI}$ between 0.7 and 21.5, the battery might have characteristics of fast charging speed, high energy density, good safety performance and long cycle life at the same time. Preferably, the value of $(80/V_{OI}+43/PD) \times PD/V_{OI}$ was between 1.8 and 16.

When the OI value of the negative film and the pressing density of the negative film were not reasonably matched and $(80/V_{OI}+43/PD) \times PD/V_{OI}<0.7$, serious lithium precipitation easily occurred on the negative electrode plate when the battery was charged under a large rate and a fast speed, therefore the battery had a higher safety hazard and the battery was very easily to dive during the cycle process. This was because, the OI value of the negative film was easily too large and beyond the preferred range, or the pressing density of the negative electrode plate was easily too small and beyond the preferred range, or the OI value of the negative film and the pressing density of the negative film both fell within the preferred ranges but the values thereof were not matched in this case, the negative active material particles tended to be distributed parallel to the negative current collector, the effective end faces capable of deintercalating and intercalating the lithium ions in the negative electrode plate were less; and if the pressing density of the negative film was too small at the same time, the electronic conductivity of the negative electrode plate was worse, the charge exchange capability between the lithium ions and the electrons on the surface of the negative active material was affected and the lithium ions were more easily reduced and precipitated on the negative electrode plate. The capacity of comparative example 1 dived after 480 cycles.

When the OI value of the negative film and the pressing density of the negative film were not reasonably matched and $(80/V_{OI}+43/PD) \times PD/V_{OI}>21.5$, serious lithium precipitation also easily occurred on the negative electrode plate when the battery was charged under a large rate and a fast speed, therefore the battery had a higher safety hazard and the battery was easily to dive during the cycle process. This was because, the OI value of the negative film was easily too small and beyond the preferred range, or the pressing density of the negative electrode plate was easily too large and beyond the preferred range, or the OI value of the negative film and the pressing density of the negative film both fell within the preferred ranges but the values thereof were not matched in this case, the negative active material particles tended to be randomly distributed, the bonding force of the negative electrode plate was worse and the electronic conductivity of the negative electrode plate was worse, the charge exchange capability between the lithium ions and the electrons on the surface of the negative active material was affected and the lithium ions were easily reduced and precipitated on the negative electrode plate; and if the pressing density of the negative film was too large at the same time, the end faces capable of deintercalating and intercalating the lithium ions in the negative active material particles partially would not play the function thereof, the charge exchange capability between the lithium ions and the electrons on the surface of the negative active material was affected and the lithium ions were more easily reduced and precipitated on the negative electrode plate. Moreover, the negative electrode plate had higher pressing density, the liquid phase conduction resistance of the lithium ions inside the porous structure of the negative film was larger, which would also affect the improvement on the charging speed of the battery. The capacity of comparative example 2 dived after 550 cycles, the capacity of comparative example 3 dived after 470 cycles, and the capacity of comparative example 4 dived after 490 cycles.

The preferred range of the pressing density of the negative film represented by PD was 0.8 g/cm³~2.0 g/cm³, the preferred range of the OI value of the negative film represented by $V_{OI}$ was 2~60. And what the applicant needed to explain was that when one or two of the pressing density of the negative film represented by PD and the OI value of the negative film represented by $V_{OI}$ did not fall within the above preferred ranges but satisfied a relationship that $(80/V_{OI}+43/PD) \times PD/V_{OI}$ was between 0.7 and 21.5, the battery might still have the characteristics of fast charging speed, high energy density, good safety performance and long cycle life at the same time, for example in example 1.

Examples 11-25 illustrated test results of further improving the dynamics performance of the negative active material when the negative electrode plate already had better dynamics performance. The negative active materials of examples 11-19 had better dynamics performance, the particle diameter of the negative active material represented by D50 and the OI value of the powder of the negative active material represented by $G_{OI}$ satisfied a relationship that $100/(D50+2.8 \times G_{OI})$ was between 2.8 and 12, therefore the charging speed, the energy density, the safety performance and the cycle life of the battery might be further improved. The preferred range of the particle diameter of the negative active material represented by D50 was 1 μm~20 μm, the preferred range of the OI value of the powder of the negative active material represented by $G_{OI}$ was 0.5~7. The dynamics performances of the negative active materials of examples 20-25 were worse than those of examples 11-19, therefore the improvement on the performance of the battery was also weak. When the particle diameter of the negative active material represented by D50 was too small and beyond the preferred range, or the OI value of the powder of the negative active material was too small and beyond the preferred range, or the particle diameter of the negative active material represented by D50 and the OI value of the powder of the negative active material both fell within the preferred ranges but the values thereof were not reasonably matched and $100/(D50+2.8 \times G_{OI}) > 12$, the negative slurry was difficult to disperse, the bonding force between the negative active material particle and the negative current collector and the bonding force between the negative active material particles of the prepared negative electrode plate were both worse, therefore the negative film had the risk of exfoliation and wrinkling, and the charging speed of the battery could not be effectively improved. When the particle diameter of the negative active material represented by D50 was too large and beyond the preferred range, or the OI value of the powder of the negative active material was too large and beyond the preferred range, or the particle diameter of the negative active material represented by D50 and the OI value of the powder of the negative active material both fell within the preferred ranges but the values thereof were not reasonably matched and $100/(D50+2.8 \times G_{OI}) < 2.8$, the negative active material itself had less end faces capable of deintercalating and intercalating the lithium ions, and the charging speed of the battery could not be effectively improved.

By further reasonably adjusting the relationship between the negative electrode plate and the negative active material and making them satisfy a relationship $2.8 \leq (X \times 0.8 + Y \times 0.2) \times Y/X \leq 15$, the overall performance of the battery was better.

What is claimed:

1. A battery comprising a negative electrode plate, the negative electrode plate comprising a negative current collector and a negative film, the negative film being provided on at least one surface of the negative current collector and comprising a negative active material;

wherein the negative active material is graphite, and an OI value of the negative film represented by $V_{OI}$ and a pressing density of the negative film represented by PD satisfy a relationship: $X=(80/V_{OI}+43/PD) \times PD/V_{OI}$ and $1.66 < X \leq 2.35$, and a unit of the pressing density of the negative film represented by PD is g/cm³, $V_{OI}=C_{004}/C_{110}$, $C_{004}$ represents a characteristic diffraction peak area of (004) crystal plane in X-ray diffraction pattern of the negative film, $C_{110}$ represents a characteristic diffraction peak area of (110) crystal plane in X-ray diffraction pattern of the negative film;

the OI value of the negative film represented by $V_{OI}$ is 20~32;

a particle diameter of the negative active material represented by D50 and an OI value of a powder of the negative active material represented by $G_{OI}$ satisfy a relationship: $Y=100/(D50+2.8 \times G_{OI})$ and $2.8 \leq Y \leq 12$, and a unit of the particle diameter of the negative active material represented by D50 is μm;

$G_{OI}=C'_{004}/C'_{110}$, $C'_{004}$ represents a characteristic diffraction peak area of (004) crystal plane in X-ray diffraction pattern of a powder of the negative active material, $C'_{110}$ represents a characteristic diffraction peak area of (110) crystal plane in X-ray diffraction pattern of the powder of the negative active material; and $2.8 \leq (X \times 0.8 + Y \times 0.2) \times Y/X \leq 11.71$.

2. The battery according to claim 1, wherein the particle diameter of the negative active material represented by D50 is 1 μm~20 μm.

3. The battery according to claim 2, wherein the particle diameter of the negative active material represented by D50 is 4 μm~15 μm.

4. The battery according to claim 3, wherein the particle diameter of the negative active material represented by D50 is 6 μm~12 μm.

5. The battery according to claim 1, wherein the graphite is one or more selected from a group consisting of natural graphite and artificial graphite.

6. The battery according to claim 1, wherein the pressing density of the negative film represented by PD is 1.0 g/cm$^3$~1.6 g/cm$^3$.

7. The battery according to claim 6, wherein the pressing density of the negative film represented by PD is 1.2 g/cm$^3$~1.5 g/cm$^3$.

8. The battery according to claim 1, wherein the particle diameter of the negative active material represented by D50 and the OI value of the powder of the negative active material represented by $G_{OI}$ satisfy a relationship: $3.14 \leq 8.45$.

9. The battery according to claim 8, wherein the particle diameter of the negative active material represented by D50 and the OI value of the powder of the negative active material represented by $G_{OI}$ satisfy a relationship: $3.14 \leq Y \leq 5.87$.

10. The battery according to claim 1, wherein $4.05 \leq (X \times 0.8 + Y \times 0.2) \times Y/X \leq 8.13$.

11. The battery according to claim 1, wherein the OI value of the powder of the negative active material represented by $G_{OI}$ is 2~4.5.

12. The battery according to claim 1, wherein the battery further comprises a positive electrode plate, the positive electrode plate comprises a positive current collector and a positive film, the positive film is provided on at least one surface of the positive current collector and comprises a positive active material, the positive active material is one or more selected from a group consisting of lithium nickel cobalt manganese oxide and lithium nickel cobalt aluminum oxide.

* * * * *